(12) United States Patent
Huang

(10) Patent No.: US 7,090,195 B1
(45) Date of Patent: Aug. 15, 2006

(54) FAUCET ASSEMBLY

(76) Inventor: Ren-Yih Huang, 58, Ma Yuan West St., Taichung (TW)

( * ) Notice: Subject to any disclaimer, the term of this patent is extended or adjusted under 35 U.S.C. 154(b) by 80 days.

(21) Appl. No.: 10/895,677

(22) Filed: Jul. 22, 2004

(51) Int. Cl.
*F16K 31/00* (2006.01)

(52) U.S. Cl. ........................ 251/339; 251/274

(58) Field of Classification Search ............. 251/339, 251/218, 273, 274
See application file for complete search history.

(56) References Cited

U.S. PATENT DOCUMENTS

| | | | | |
|---|---|---|---|---|
| 2,405,681 A * | 8/1946 | Woock | ............ | 222/400.5 |
| 2,658,716 A * | 11/1953 | Winfree | ............ | 251/273 |
| 2,785,881 A * | 3/1957 | Dolan | ............ | 239/417.3 |
| 4,176,674 A * | 12/1979 | Rodriguez | ............ | 137/315.14 |
| 4,456,222 A * | 6/1984 | Shen | ............ | 251/230 |
| 4,981,160 A * | 1/1991 | Sen-Tein | ............ | 137/801 |
| 5,704,397 A * | 1/1998 | Lu | ............ | 137/630.15 |
| 6,131,608 A * | 10/2000 | Lu | ............ | 137/550 |
| 6,443,427 B1 * | 9/2002 | Coupal | ............ | 251/351 |
| 6,942,195 B1 * | 9/2005 | Kao | ............ | 251/339 |

* cited by examiner

*Primary Examiner*—Justine R. Yu
*Assistant Examiner*—Andrew J. Rost
(74) *Attorney, Agent, or Firm*—Alan D. Kamrath; Nikolai & Mersereau, P.A.

(57) ABSTRACT

A faucet assembly includes a faucet body, a valve seat, a control shaft, a sealing member, and a control handle. Thus, the control handle is located under the faucet body to facilitate a user operating the control handle, so that the control handle is operated easily and conveniently. In addition, the control handle is located under the faucet body, so that the user can operate the control handle to stop the water flow after use easily and conveniently, thereby saving the water resource.

14 Claims, 5 Drawing Sheets

FAUCET ASSEMBLY

BACKGROUND OF THE INVENTION

1. Field of the Invention

The present invention relates to a faucet assembly, and more particularly to a faucet assembly that can save the water resource.

2. Description of the Related Art

A conventional faucet comprises a faucet body, and a control handle mounted on a top of the faucet body to control a water flow from the faucet body. However, the control handle is located above the faucet body, so that the control handle cannot be washed easily and conveniently, thereby causing inconvenience to a user in cleaning the control handle. In addition, the water still flows outward from the faucet body when the user operates the control handle to stop the water flow after use, thereby greatly consuming the water resource.

SUMMARY OF THE INVENTION

In accordance with the present invention, there is provided a faucet assembly, comprising:

a faucet body having an inside formed with a mounting chamber;

a valve seat mounted in the mounting chamber of the faucet body and having an inside formed with a water chamber having an open first end formed with an opening connected to the mounting chamber of the faucet body and a second end having a plurality of water outlet holes;

a control shaft rotatably mounted on the valve seat and having a first end formed with an adjusting portion movable in the water chamber of the valve seat by rotation of the control shaft; and a sealing member mounted on the adjusting portion of the control shaft to move therewith.

The primary objective of the present invention is to provide a faucet assembly that can save the water resource.

Another objective of the present invention is to provide a faucet assembly, wherein the control handle is located under the faucet body to facilitate a user operating the control handle, so that the control handle is operated easily and conveniently.

A further objective of the present invention is to provide a faucet assembly, wherein the control handle is located under the faucet body, so that when the water flows outward, the control handle is also washed by the water flow, thereby facilitating the user cleaning the control handle.

A further objective of the present invention is to provide a faucet assembly, wherein the control handle is located under the faucet body, so that the user can operate the control handle to stop the water flow after use easily and conveniently, thereby saving the water resource.

Further benefits and advantages of the present invention will become apparent after a careful reading of the detailed description with appropriate reference to the accompanying drawings.

DETAILED DESCRIPTION OF THE INVENTION

Figure 1:
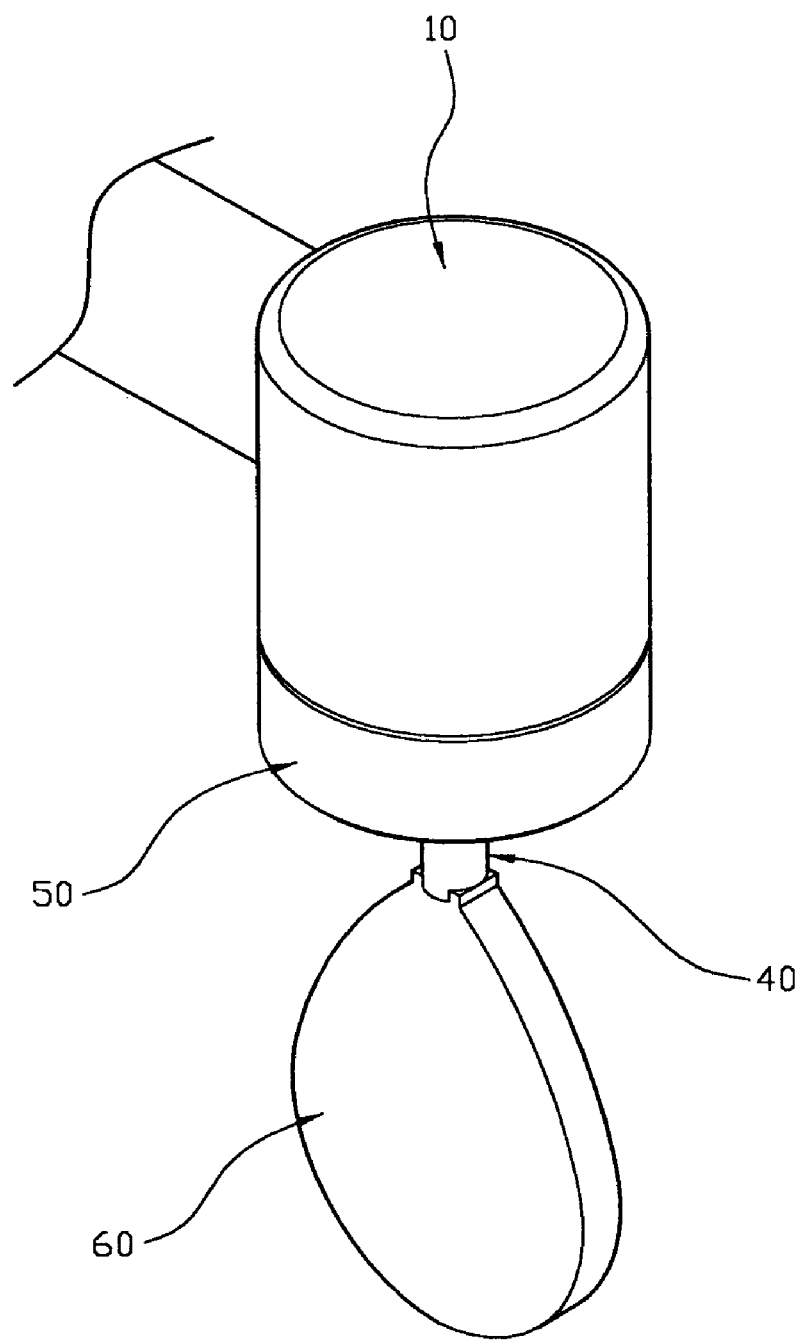
FIG. 1 is a partially cut-away perspective view of a faucet assembly in accordance with the preferred embodiment of the present invention.
Figure 2:
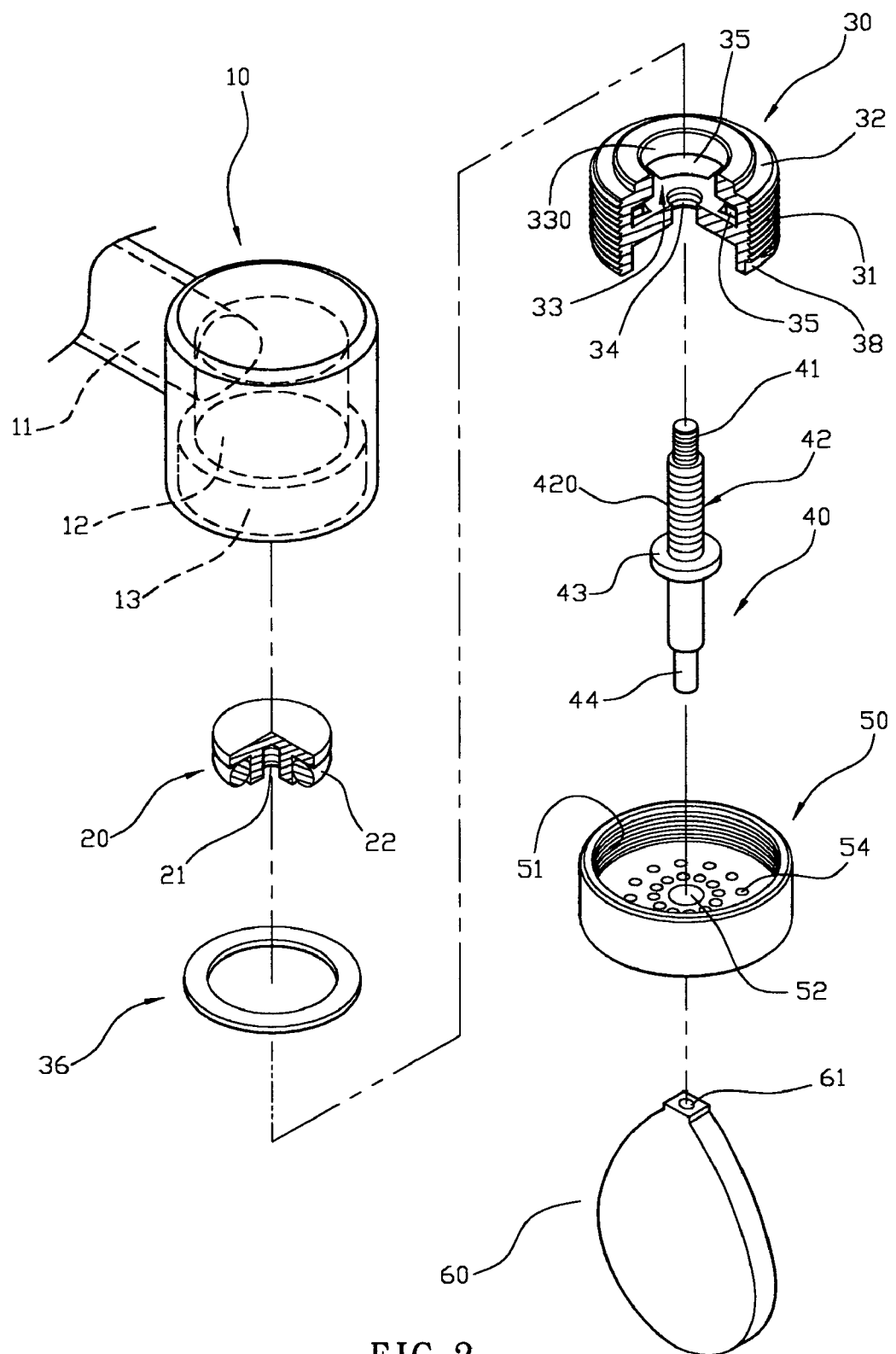
FIG. 2 is an exploded perspective view of the faucet assembly as shown in FIG. 1.
Figure 3:
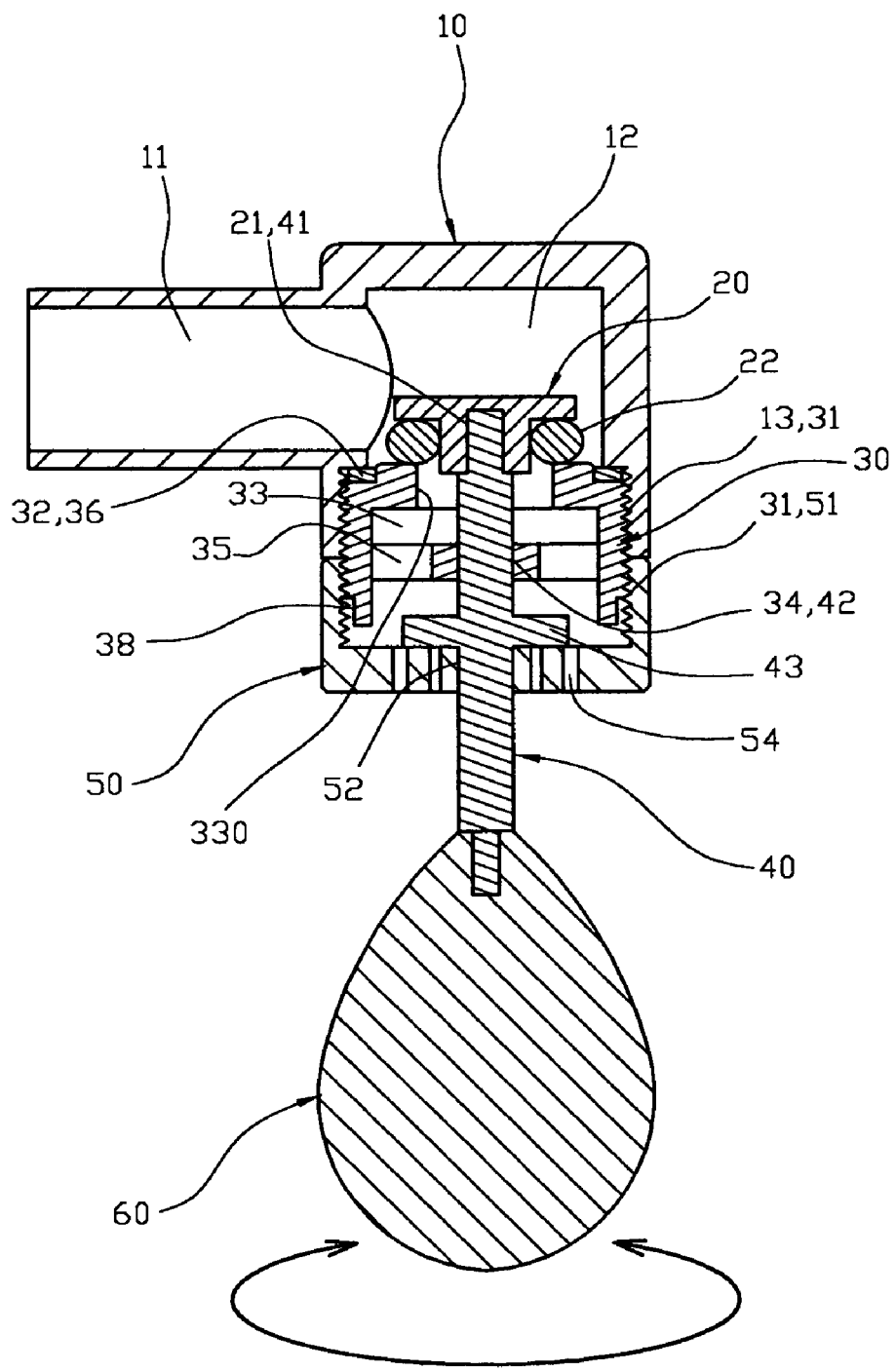
FIG. 3 is a plan cross-sectional view of the faucet assembly as shown in FIG. 1.

Referring to the drawings and initially to FIGS. 1–3, a faucet assembly in accordance with the preferred embodiment of the present invention comprises a faucet body 10 having an inside formed with a mounting chamber 12, a valve seat 30 mounted in the mounting chamber 12 of the faucet body 10 and having an inside formed with a water chamber 33 having an open first end formed with an opening 330 connected to the mounting chamber 12 of the faucet body 10 and a second end having a plurality of water outlet holes 35, a control shaft 40 rotatably mounted on the valve seat 30 and having a first end formed with an adjusting portion 42 movable in the water chamber 33 of the valve seat 30 by rotation of the control shaft 40, and a sealing member 20 mounted on the adjusting portion 42 of the control shaft 40 to move therewith and movable between a first position where the sealing member 20 is rested on the valve seat 30 to seal the opening 330 of the water chamber 33 of the valve seat 30 to interrupt a connection between the opening 330 of the water chamber 33 of the valve seat 30 and the mounting chamber 12 of the faucet body 10 and a second position where the sealing member 20 is detached from the opening 330 of the water chamber 33 of the valve seat 30 to connect the opening 330 of the water chamber 33 of the valve seat 30 to the mounting chamber 12 of the faucet body 10.

The faucet body 10 has a side formed with a water inlet channel 11 connected to a water pipe (not shown) and communicating with the mounting chamber 12. The mounting chamber 12 of the faucet body 10 has an end formed with an inner thread 13.

The sealing member 20 has a circular shape and has an inside formed with a screw bore 21. A sealing ring 22 is mounted on a peripheral wall of the sealing member 20 and rested on the valve seat 30 to seal the opening 330 of the water chamber 33 of the valve seat 30.

The valve seat 30 has a first end formed with an annular retaining groove 32 for mounting a sealing ring 36 which is urged on a wall of the mounting chamber 12 of the faucet body 10. The valve seat 30 has a second end formed with a tool portion 38 for holding a hand tool (not shown), such as a wrench or the like. The valve seat 30 has an outside formed with an outer thread 31 having a first portion screwed into the inner thread 13 of the faucet body 10 and a second portion protruding outward from the faucet body 10. The closed second end of the water chamber 33 of the valve seat 30 has a center formed with a screw bore 34.

The adjusting portion 42 of the control shaft 40 is formed with an outer thread 420 screwed into the screw bore 34 of the valve seat 30 and has a distal end formed with a screwing portion 41 screwed into the screw bore 21 of the sealing member 20. The control shaft 40 has a mediate portion formed with a circular catch portion 43 and a second end protruding outward from the valve seat 30 and formed with a fixing portion 44.

A bubble generator 50 is mounted on the valve seat 30 and rested on a bottom of the faucet body 10. The bubble generator 50 has an inside formed with an inner thread 51 screwed onto the second portion of the outer thread 31 of the valve seat 30. The bubble generator 50 has a closed wall having a periphery formed with a plurality of through holes 54 communicating with the water outlet holes 35 of the valve seat 30 and having a central portion formed with a passage 52 mounted on the second end of the control shaft 40. The catch portion 43 of the control shaft 40 is movable between a first position where the catch portion 43 of the control shaft 40 is rested on the closed wall of the bubble generator 50 to seal the through holes 54 of the bubble generator 50 to interrupt a connection between the through holes 54 of the bubble generator 50 and the water outlet holes 35 of the valve seat 30 and a second position where the catch portion 43 of the control shaft 40 is detached from the through holes 54 of the bubble generator 50 to connect the through holes 54 of the bubble generator 50 to the water outlet holes 35 of the valve seat 30.

A control handle 60 is mounted on the second end of the control shaft 40 to rotate the control shaft 40 and has an end formed with a fixing hole 61 mounted on the fixing portion 44 of the control shaft 40. The control handle 60 is located under the faucet body 10 and the bubble generator 50.

When in use, referring to FIGS. 1–5, when the control handle 60 is rotated, the control shaft 40 is rotated by rotation of the control handle 60. At this time, the outer thread 420 of the adjusting portion 42 of the control shaft 40 is screwed into the screw bore 34 of the valve seat 30, so that when the control shaft 40 is rotated, the adjusting portion 42 of the control shaft 40 is movable in the water chamber 33 of the valve seat 30 by rotation of the control shaft 40.

As shown in FIG. 3, the adjusting portion 42 of the control shaft 40 is moved to the first position where the sealing ring 22 of the sealing member 20 is rested on the valve seat 30 to seal the opening 330 of the water chamber 33 of the valve seat 30 to interrupt the connection between the opening 330 of the water chamber 33 of the valve seat 30 and the mounting chamber 12 of the faucet body 10, while the catch portion 43 of the control shaft 40 is rested on the closed wall of the bubble generator 50 to seal the through holes 54 of the bubble generator 50 to interrupt the connection between the through holes 54 of the bubble generator 50 and the water outlet holes 35 of the valve seat 30, thereby stopping the water flow.

Figure 4:
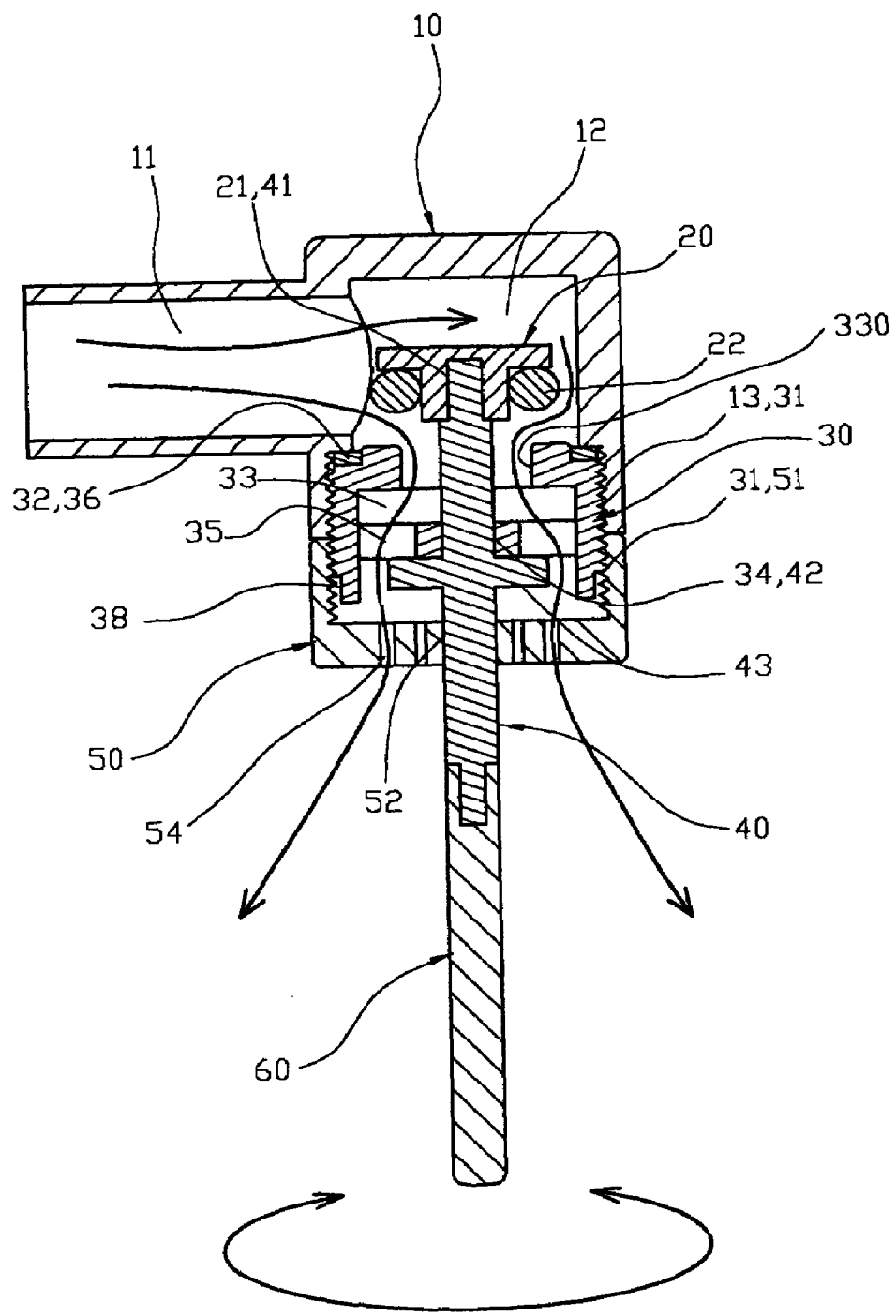
FIG. 4 is a schematic operational view of the faucet assembly as shown in FIG. 3 in use.
Figure 5:
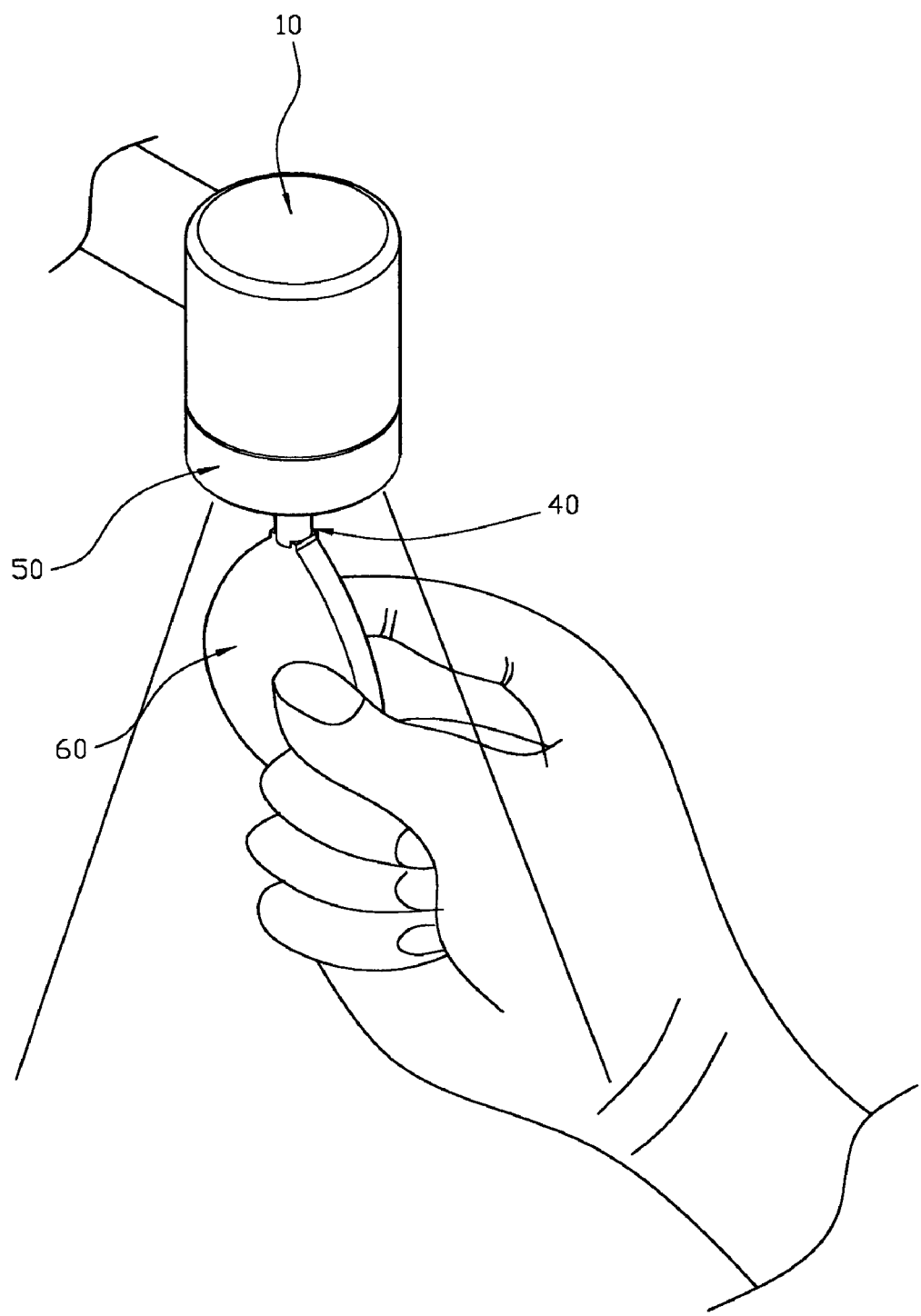
FIG. 5 is a schematic operational view of the faucet assembly as shown in FIG. 1 in use.

As shown in FIGS. 4 and 5, the adjusting portion 42 of the control shaft 40 is moved to the second position where the sealing ring 22 of the sealing member 20 is detached from the opening 330 of the water chamber 33 of the valve seat 30 to connect the opening 330 of the water chamber 33 of the valve seat 30 to the mounting chamber 12 of the faucet body 10, while the catch portion 43 of the control shaft 40 is detached from the through holes 54 of the bubble generator 50 to connect the through holes 54 of the bubble generator 50 to the water outlet holes 35 of the valve seat 30.

In such a manner, the water flow from the water inlet channel 11 of the faucet body 10 in turn flows through the mounting chamber 12 of the faucet body 10, the opening 330 of the water chamber 33 of the valve seat 30, the water outlet holes 35 of the valve seat 30 and the through holes 54 of the bubble generator 50 and flows outward from the bubble generator 50 for use with a user as shown in FIG. 5.

Accordingly, the control handle 60 is located under the faucet body 10 to facilitate the user operating the control handle 60, so that the control handle 60 is operated easily and conveniently. In addition, the control handle 60 is located under the faucet body 10, so that when the water flows outward, the control handle 60 is also washed by the water flow, thereby facilitating the user cleaning the control handle 60. Further, the control handle 60 is located under the faucet body 10, so that the user can operate the control handle 60 to stop the water flow after use easily and conveniently, thereby saving the water resource.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A faucet assembly, comprising:
   a faucet body having an inside formed with a mounting chamber;
   a valve seat mounted in the mounting chamber of the faucet body and having an inside formed with a water chamber having an open first end formed with an opening connected to the mounting chamber of the faucet body and a second end having a plurality of water outlet holes;
   a control shaft rotatably mounted on the valve seat and having a first end formed with an adjusting portion movable in the water chamber of the valve seat by rotation of the control shaft; and
   a sealing member mounted on the adjusting portion of the control shaft to move therewith;
   wherein the second end of the water chamber of the valve seat has a center formed with a screw bore, and the adjusting portion of the control shaft is formed with an outer thread screwed into the screw bore of the valve seat.

2. The faucet assembly in accordance with claim 1, wherein the sealing member is movable between a first position where the sealing member is rested on the valve seat to seal the opening of the water chamber of the valve seat to interrupt a connection between the opening of the water chamber of the valve seat and the mounting chamber of the faucet body and a second position where the sealing member is detached from the opening of the water chamber of the valve seat to connect the opening of the water chamber of the valve seat to the mounting chamber of the faucet body.

3. The faucet assembly in accordance with claim 1, further comprising a sealing ring mounted on a peripheral wall of the sealing member and rested on the valve seat to seal the opening of the water chamber of the valve seat.

4. The faucet assembly in accordance with claim 1, wherein the sealing member has an inside formed with a screw bore, and the adjusting portion of the control shaft has a distal end formed with a screwing portion screwed into the screw bore of the sealing member.

5. The faucet assembly in accordance with claim 1, wherein the valve seat has a first end formed with an annular retaining groove for mounting a sealing ring which is urged on a wall of the mounting chamber of the faucet body.

6. The faucet assembly in accordance with claim 1, wherein the valve seat has a second end formed with a tool portion.

7. The faucet assembly in accordance with claim 1, further comprising a control handle mounted on a second end of the control shaft to rotate the control shaft.

8. The faucet assembly in accordance with claim 7, wherein the second end of the control shaft is protruded outward from the valve seat and formed with a fixing portion, and the control handle has an end formed with a fixing hole mounted on the fixing portion of the control shaft.

9. A faucet assembly, comprising:

a faucet body having an inside formed with a mounting chamber;

a valve seat mounted in the mounting chamber of the faucet body and having an inside formed with a water chamber having an open first end formed with an opening connected to the mounting chamber of the faucet body and a second end having a plurality of water outlet holes;

a control shaft rotatable mounted on the valve seat and having a first end formed with an adjusting portion movable in the water chamber of the valve seat by rotation of the control shaft:

a sealing member mounted on the adjusting portion of the control shaft to move therewith;

a bubble generator mounted on the valve seat and rested on a bottom of the faucet body;

wherein the bubble generator has a closed wall having a periphery formed with a plurality of through holes communicating with the water outlet holes of the valve seat;

the control shaft has a mediate portion formed with a circular catch portion movable between a first position where the catch portion of the control shaft is rested on the closed wall of the bubble generator to seal the through holes of the bubble generator to interrupt a connection between the through holes of the bubble generator and the water outlet holes of the valve seat and a second position where the catch portion of the control shaft is detached from the through holes of the bubble generator to connect the through holes of the bubble generator to the water outlet holes of the valve seat.

10. The faucet assembly in accordance with claim 9, wherein the closed wall of the bubble generator has a central portion formed with a passage mounted on the second end of the control shaft.

11. The faucet assembly in accordance with claim 9, wherein the catch portion of the control shaft has a circular shape.

12. The faucet assembly in accordance with claim 9, wherein the mounting chamber of the faucet body has an end formed with an inner thread, the valve seat has an outside formed with an outer thread having a first portion screwed into the inner thread of the faucet body and a second portion protruding outward from the faucet body, and the bubble generator has an inside formed with an inner thread screwed onto the second portion of the outer thread of the valve seat.

13. The faucet assembly in accordance with claim 1, wherein the mounting chamber of the faucet body has an end formed with an inner thread, and the valve seat has an outside formed with an outer thread screwed into the inner thread of the faucet body.

14. The faucet assembly in accordance with claim 1, wherein the sealing member has a circular shape.

* * * * *